United States Patent [19]

Chu

[11] Patent Number: 4,914,019

[45] Date of Patent: Apr. 3, 1990

[54] MULTI-PURPOSE LEARNING DEVICE

[76] Inventor: Tung Y. Chu, 11303 1st Pl., W., Everett, Wash. 98204

[21] Appl. No.: 307,266

[22] Filed: Feb. 6, 1989

[51] Int. Cl.⁴ .......................... G09B 1/36; A63H 33/08
[52] U.S. Cl. .................................... 434/171; 434/172; 434/195; 434/196; 434/403; 446/127
[58] Field of Search ............... 434/168, 171, 172, 189, 434/195, 196, 205, 403; 446/124, 127

[56] References Cited

U.S. PATENT DOCUMENTS

| | | | |
|---|---|---|---|
| 1,649,578 | 11/1927 | Deming | 434/196 |
| 1,902,136 | 3/1933 | Mills | 446/124 |
| 2,570,625 | 10/1951 | Zimmerman et al. | 434/403 X |
| 3,094,792 | 6/1963 | Morgan et al. | 434/195 |
| 3,235,975 | 2/1966 | Pierson | 434/189 |
| 3,728,800 | 4/1973 | Magram | 434/171 |
| 3,818,841 | 6/1974 | Tsurumi | 446/124 X |
| 4,044,476 | 8/1977 | Marsh | 434/171 |
| 4,822,283 | 4/1989 | Roberts | 434/172 X |

Primary Examiner—William H. Grieb

[57] ABSTRACT

This invention deals with a multi-purpose learning device for mathematics, language, logic reasoning, and classification of objects.

4 Claims, 8 Drawing Sheets

MULTI-PURPOSE LEARNING DEVICE

BACKGROUND OF INVENTION

The multi-purpose learning device can be used in learning and exploring the field of mathematics, language, logic reasoning, and classification of objects.

Most inventions for teaching or aiding in teaching of mathematics are quite limited in their usage. The prior art approaches do not provide young children with a good understanding of the number system. In addition, many of the prior art approaches do not encourage young children to think logically.

It is the objective of this invention to overcome some of the drawbacks of the prior inventions.

SUMMARY OF THE INVENTION

This device is simple to use. Young children can construct simple experiments with this device to get a better understanding of the basic principle of the subjects that are mentioned in this disclosure. Using this device, young children can explore and understand fractional numbers. It is easy to show to a child what division really means.

It has been found that it is difficult for young children to understand ordinal relationship. This multi-purpose learning device enables young children to see ordinal relationship. With concrete objects that a child can manipulate, the child's process of reasoning will not be very confused.

DESCRIPTION OF THE PREFERRED EMBODIMENT

Figure 1:
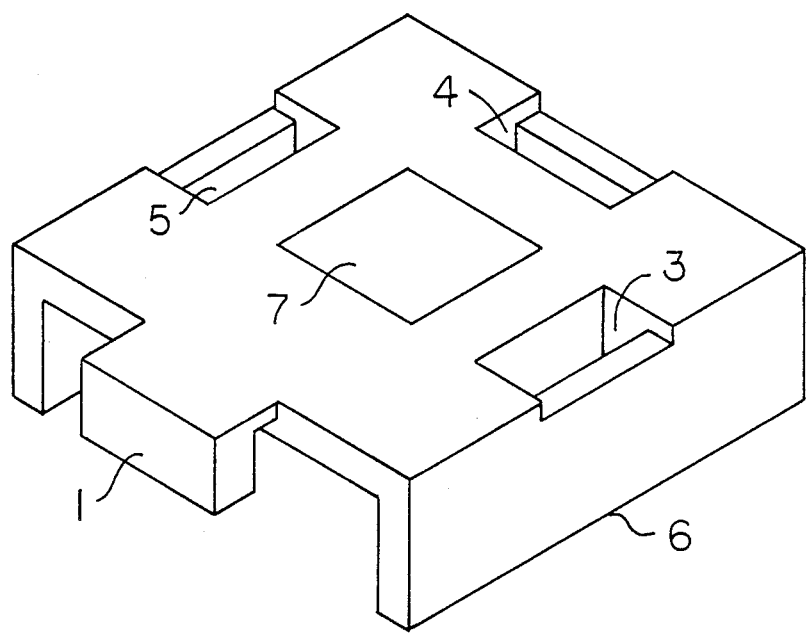
FIG. 1 is a perspective view of the invention.

Referring to FIG. 1, openings 3, 4, or 5 can receive interlock 1 of another device of the same kind. Connection is simply made by inserting the interlock 1 of one device into any one of the openings designated by 3, 4, or 5 of another device of this kind. Using this procedure, one can connect a number of such devices in various ways. Indicium 7 may be a number, a symbol, a picture, a word, a character, a blank, or a combination thereof. The length of the embodiment is designated by 6.

Figure 2:
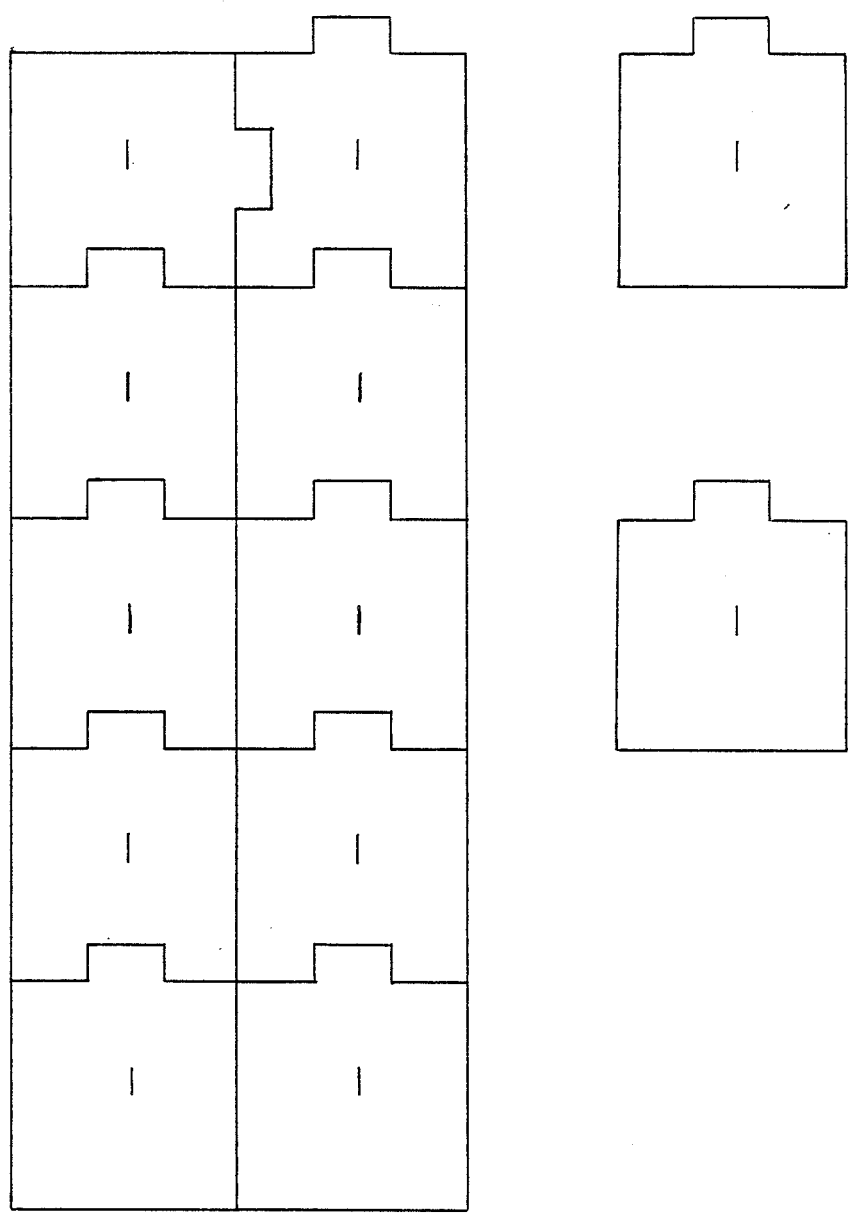
FIG. 2 is a front elevational view showing the number 12 in base 10 number system.
Figure 3:
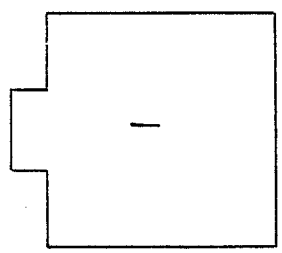
FIG. 3 is a front elevational view showing the number 12 in base 8 number system.
Figure 3:
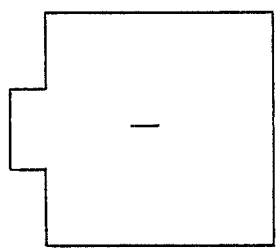
Figure 3:
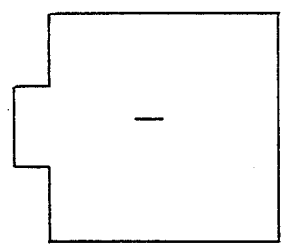
Figure 3:
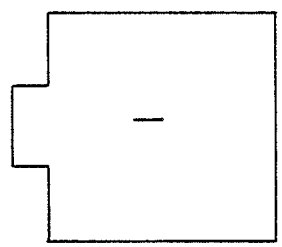
Figure 3:
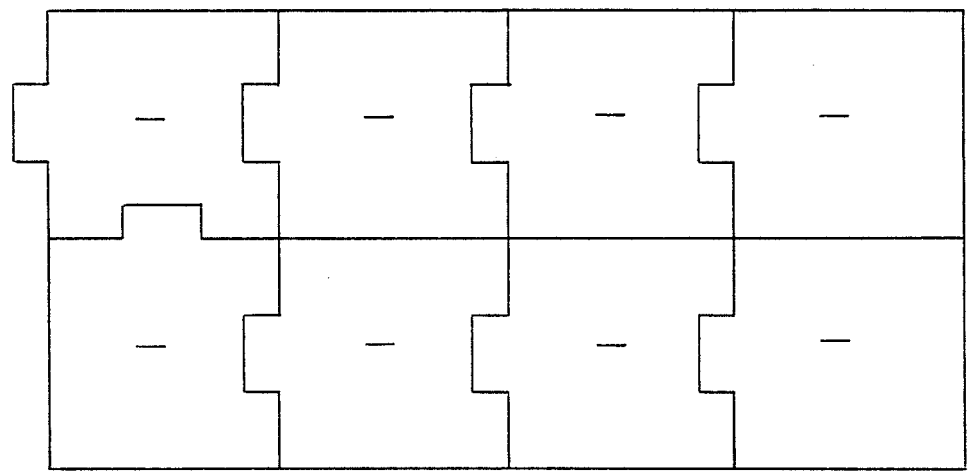

FIG. 2 and FIG. 3 illustrate how a number is represented in different number systems.

As an example, let's take 12 embodiments and try to convert from one base number to another base number.

Since we are familiar with the base 10 number system, let's represent the 12 embodiments in base 10 number system by connecting ten of the separate embodiments together to represent the ten's place in the base 10 number system and leave the remaining separate embodiments to represent the unit's place in the base 10 number system. What we have is 1 ten's place and 2 unit's place. This gives a visual picture of the number 12 in base 10 number system.

To convert the number 12 in base 10 number system to a number in base 8 number system, we simply connect eight of the separate embodiments together to represent the eight's place in the base 8 number system and leave the remaining separate embodiments to represent the unit's place in the base 8 number system. Thus, the number 12 in base 10 is represented by 1 eight's place and 4 unit's place (14) in base 8. This gives the child a visual representation of the same number in a different number system. FIG. 3 shows the number 12 in base 8 number system.

Figure 4:
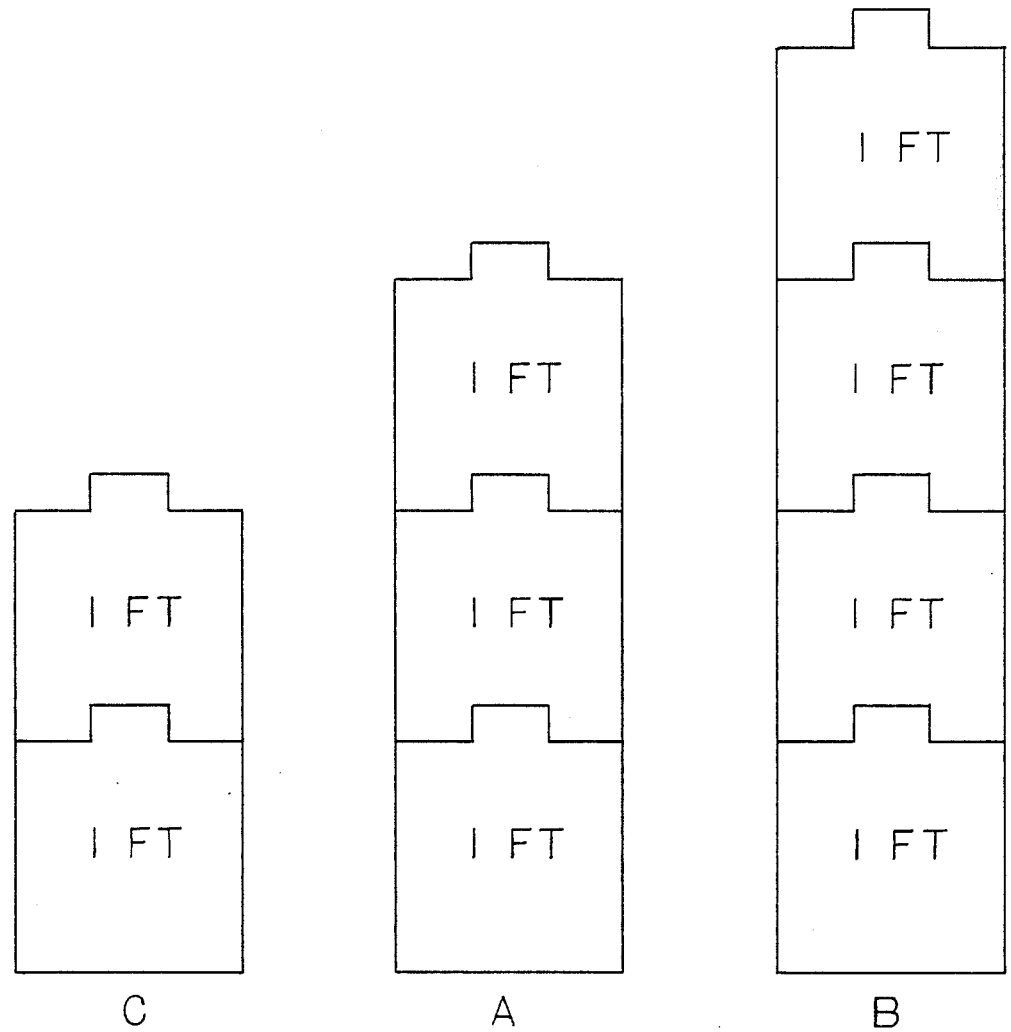
FIG. 4 is a front elevational view when it is used to show ordinal relationship.

FIG. 4 shows how to help a child understand ordinal relationship.

It is difficult for young child to understand ordinal relationship. To illustrate ordinal relationship, let's use the following as an example: Edith is taller than Suzanne. Suzanne is taller than Mary. Which is shortest, Edith, Suzanne, or Mary?.

To solve this problem, first construct A and B, such that A is shorter than B, as shown in FIG. 4. A is formed by connecting three separate embodiments together and B is formed by connecting four separate embodiments together. Each of the separate embodiments that make up A and B has the same dimensions.

Since Edith is taller than Suzanne and A is shorter than B, let A be Suzanne and B be Edith. Because Suzanne is taller than Mary, we can construct C such that it is shorter than A. In FIG. 4, C is formed by connecting 2 separate embodiments together. Each of the separate embodiments that make up C has the same dimensions as in A and B. From FIG. 4, it is easy to visualize that C is the shortest of A, B, and C. Now the child can say that Mary is the shortest of all.

Figure 5:
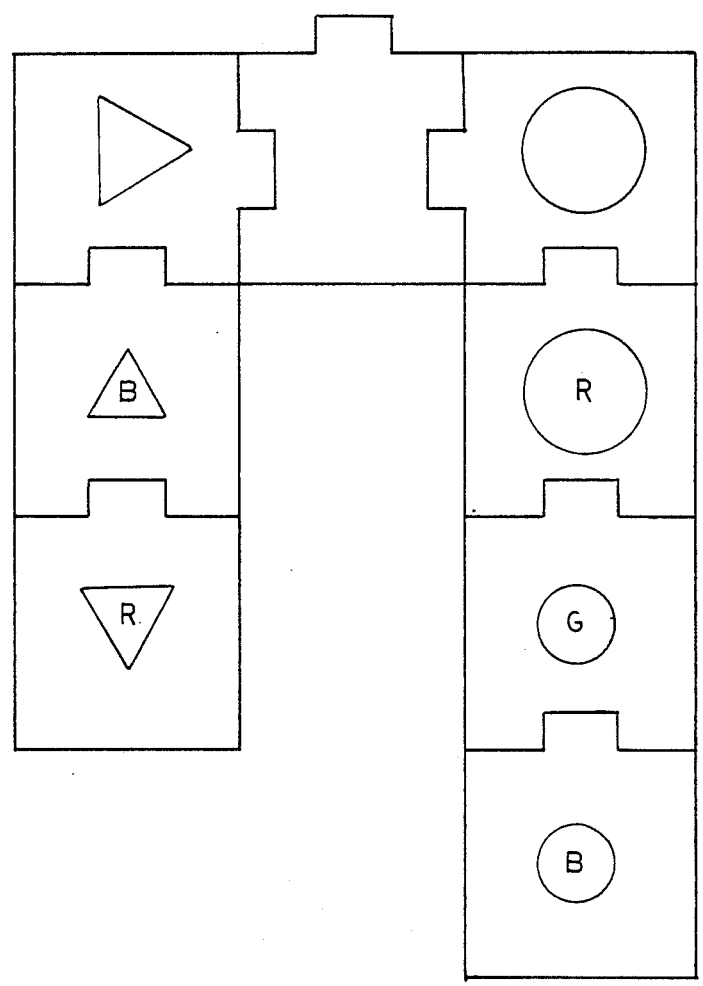
FIG. 5 is a front elevational view when it is used to show classification of objects.

FIG. 5 shows how it can be used for classification of objects.

To illustrate that, let's take an array which contains a large red triangle, a small green circle, a small blue circle, a large red circle, and a small blue triangle.

Using this device, it is easy to show a hierachical structure. FIG. 5 shows a hierachical structure formed by classifying the objects by shapes; but it is possible to show a different hierachical structure by classifying the objects by colors. Depending on the criteria that one uses in classifying the objects, one may end up with an entirely different hierachical structure. This multi-purpose learning device enables the child to explore the various ways of classifying objects.

Figure 6:
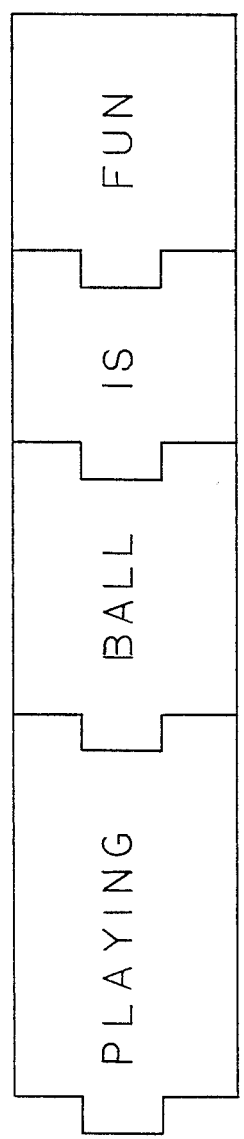
FIG. 6 is a front elevational view when it is used to show how it can be applied to learning a language.

FIG. 6 shows how one can use this device to explore sentence structures.

To illustrate how this can be done, construct a sentence by grouping the words together to form a complete thought. The sentence, "playing ball is fun", in FIG. 6 illustrates a simple sentence. Words like "definitely" and "somewhat" can be added to describe the word "fun". This learning device allows the child to explore with the different sentence structures.

Figure 7:
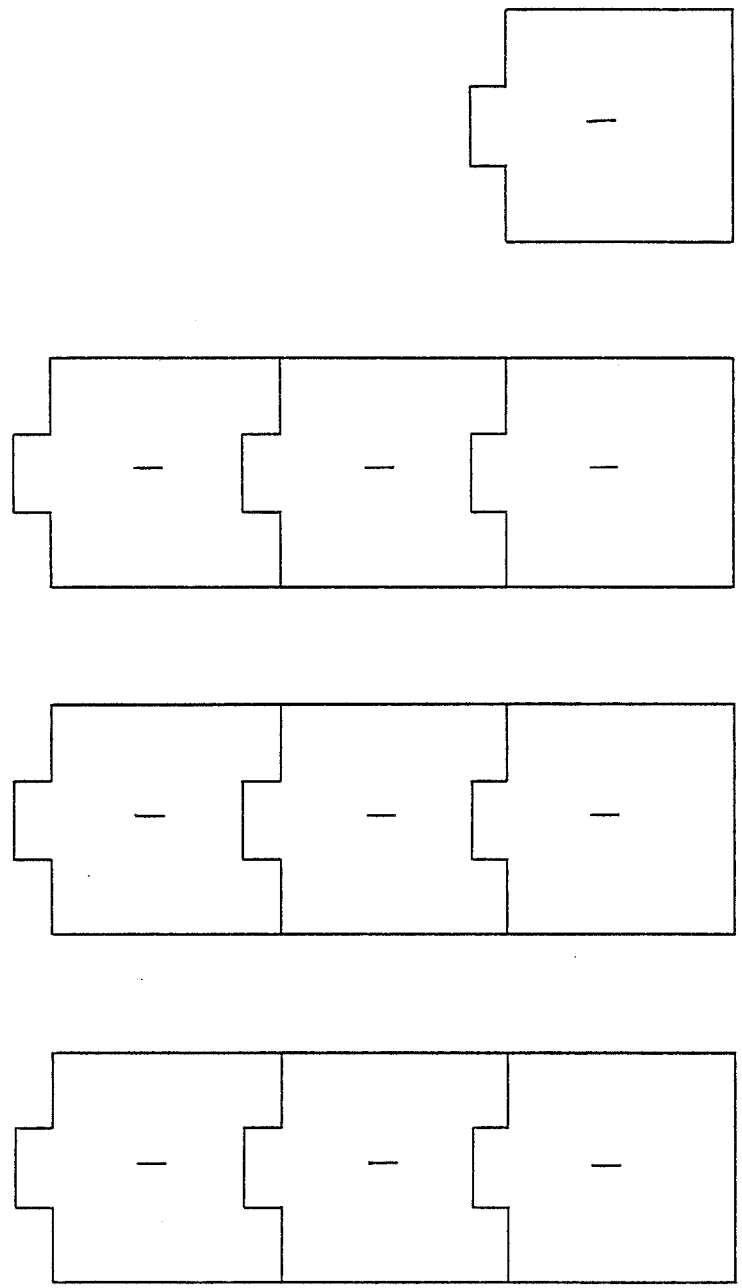
FIG. 7 is a front elevational view showing 10 divided by 3.

FIG. 7 illustrates how this device is used in division.

As an example, let's divide 10 by 3. Since the number 10 is divided by 3, we would connect all the separate embodiments in groups of three's. What we end up with is 3 groups of three's and one separate embodiment remaining. This gives a visual picture of what division is. If we were to take the remaining separate embodiment and compared it with any of the groups of three's, we would see that the remaining embodiment is only one out of any of the groups of three's. This gives the child a visual picture of the fractional number ⅓.

Figure 8:
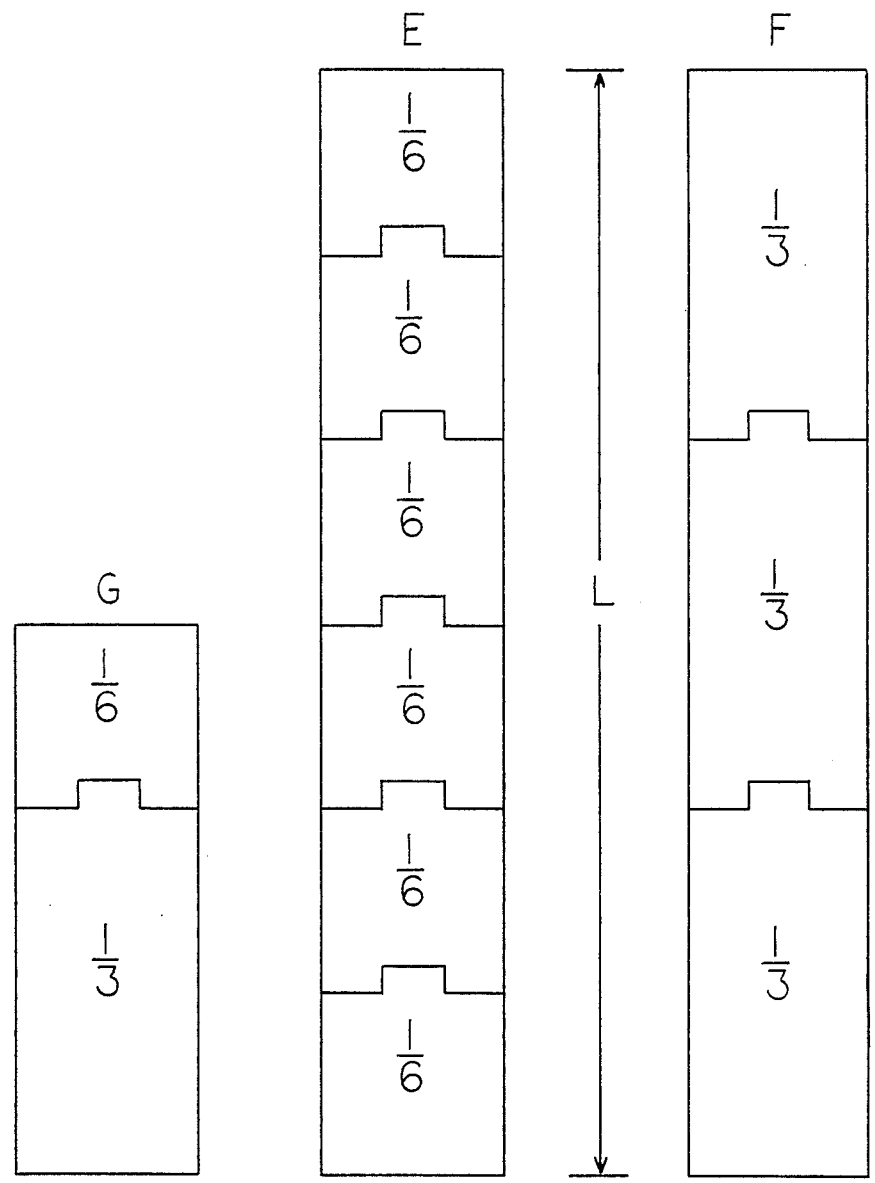
FIG. 8 is front elevational view showing the sum of two fractional numbers.

FIG. 8 shows how this device can be used to sum two fractional numbers. In FIG. 8, let L be one unit length; and let the length of each of the separate embodiments in E be 1/6 of L and the length of each of the separate embodiments in F be ⅓ of L.

If we were to teach a child how to find the result of ⅓+1/6, we would take one of the embodiments from E and one of the embodiments from F and connect them together to form G, as shown in FIG. 8. By comparing G with E, the child could see that the sum of 1/6+⅓ is 3/6 or ½. This gives the child a visual picture of adding two fractional numbers together.

Although a number of examples have been illustrated, it should be understood that the usage is not limited. As is apparent from the foregoing specification, the present invention is susceptible of being embodied with various modifications that may differ from the description in this disclosure.

I claim:

1. A block structure comprising,
   (a) a plurality of openings, capable of receiving one interlock per said opening, each of said openings being located near the side of said block structure and each of said openings being recessed from the face of said block structure,
   (b) a pair of parallel support members, each of said support members forming the side of said block structure,
   (c) an arm mounted to one side of said block member and made to insert into an opening of another block member,
   (d) and a recessed area on the face of said block structure for removably holding an indicium block.

2. The block structure of claim 1 further comprising, an indicium block adapted to be inserted into the recessed area on the face of the block structure.

3. The block structure of claim 2, wherein the indicium block has an indicium that is composed of one of the following: a character, a number, a letter, a word, a phrase, a blank, a symbol, a picture, or a combination thereof.

4. The block structure of claim 3, wherein the indicium is a character selected from different foreign languages including the Far Eastern languages, phonetic symbols, and Braille characters.

* * * * *